United States Patent
DeLuca et al.

(10) Patent No.: US 6,530,450 B2
(45) Date of Patent: *Mar. 11, 2003

(54) FAULT REACTIVE SECURELY STOPPED VEHICLE METHOD AND APPARATUS

(76) Inventors: Michael DeLuca, 734 Camino Gardens La., Boca Raton, FL (US) 33432; Joan DeLuca, 734 Camino Gardens La., Boca Raton, FL (US) 33432

( * ) Notice: Subject to any disclaimer, the term of this patent is extended or adjusted under 35 U.S.C. 154(b) by 0 days.

This patent is subject to a terminal disclaimer.

(21) Appl. No.: 09/923,691

(22) Filed: Aug. 7, 2001

(65) Prior Publication Data

US 2002/0020575 A1 Feb. 21, 2002

Related U.S. Application Data

(63) Continuation-in-part of application No. 09/917,086, filed on Jul. 27, 2001, which is a continuation-in-part of application No. 09/634,279, filed on Aug. 9, 2000, now Pat. No. 6,286,617.

(51) Int. Cl.[7] ............................................. B60K 28/10
(52) U.S. Cl. ..................................... 180/275; 303/191
(58) Field of Search ................................ 180/275, 276, 180/278, 282, 272; 303/191, 195, 72, 114.1, 115.2; 192/219.1

(56) References Cited

U.S. PATENT DOCUMENTS

| | | | |
|---|---|---|---|
| 3,882,959 A | 5/1975 | Hsieh | |
| 4,403,674 A | * 9/1983 | Viall, Sr. et al. | 180/275 |
| 4,497,395 A | 2/1985 | Nogami et al. | |
| 4,681,196 A | 7/1987 | Fulmer et al. | |
| 4,708,406 A | 11/1987 | Takagi | |
| 4,768,610 A | 9/1988 | Pagel et al. | |
| 4,871,215 A | * 10/1989 | Takayama | 303/100 |
| 4,925,252 A | 5/1990 | Hee | |
| 4,971,400 A | 11/1990 | Jonner | |
| 5,135,291 A | 8/1992 | Hee | |
| 5,170,858 A | 12/1992 | Chen | |
| 5,209,329 A | 5/1993 | Sigl et al. | |
| 5,415,467 A | 5/1995 | Utz et al. | |
| 5,484,044 A | 1/1996 | Bursteinas et al. | |
| 5,570,078 A | 10/1996 | Wayenberg | |
| 5,764,136 A | 6/1998 | Harron | |
| 5,779,328 A | 7/1998 | Mergenthaler et al. | |
| 5,791,750 A | 8/1998 | Spiegelberg | |
| 5,797,467 A | 8/1998 | Watanabe | |
| 5,967,628 A | 10/1999 | Abe et al. | |
| 5,979,619 A | 11/1999 | Rump | |
| 5,984,429 A | 11/1999 | Nell et al. | |
| 5,988,333 A | 11/1999 | Catton | |
| 6,009,984 A | * 1/2000 | Zechmann et al. | 188/353 |
| 6,015,194 A | 1/2000 | Decker | |
| 6,056,373 A | 5/2000 | Zechmann et al. | |

(List continued on next page.)

*Primary Examiner*—Paul N. Dickson
*Assistant Examiner*—David R. Dunn
(74) *Attorney, Agent, or Firm*—IdeoCo.com (57) ABSTRACT

The braking system of a vehicle is securely engaged in response to the operator of the vehicle causing the vehicle to stop. The braking system improves vehicle safety by remaining securely engaged upon detection of a fault such as a vehicle collision, an unintentional transmission shift, a vehicle malfunction or a problem with the operator or operation of the vehicle. In the event of a collision, securely engaged brakes can significantly reduce resulting vehicle acceleration, potentially avoiding a secondary collision and reducing injuries experienced by the vehicle operator and passengers. In the event that no fault is detected, the braking system is disengaged in response to the operator accelerating the vehicle, either by pressing the gas pedal or releasing the brake pedal, thereby making the securely engaged brakes virtually unperceivable under normal operating circumstances. The braking system may be released rapidly in response to a substantially depressed gas pedal to facilitate a rapid start or gradually in response to a partially depressed gas pedal to facilitate a smooth start.

20 Claims, 3 Drawing Sheets

U.S. PATENT DOCUMENTS

| | | | |
|---|---|---|---|
| 6,086,515 A | | 7/2000 | Buschmann et al. |
| 6,105,705 A | * | 8/2000 | Faye .......................... 180/275 |
| 6,139,117 A | | 10/2000 | Shirai et al. |
| 6,193,332 B1 | | 2/2001 | Ono |
| 6,234,586 B1 | | 5/2001 | Davis et al. |
| 6,246,313 B1 | * | 6/2001 | Baker et al. ............. 340/425.5 |
| 6,256,568 B1 | | 7/2001 | Siepker et al. |
| 6,256,571 B1 | | 7/2001 | Fischer et al. |
| 6,267,194 B1 | * | 7/2001 | Bullinger et al. ........... 180/275 |
| 6,286,617 B1 | * | 9/2001 | DeLuca et al. ............. 180/275 |
| 6,315,372 B1 | * | 11/2001 | Kroger et al. .............. 303/191 |
| 6,364,433 B1 | * | 4/2002 | Stemer ....................... 303/138 |

\* cited by examiner

| FAULT DETECT | FAULT CLEAR |
|---|---|
| TRANSMISSION IN PARK OR NEUTRAL | IGNITION ON AND ENGINE RUNNING AND TRANSMISSION IN DRIVE OR REVERSE GEAR |
| ENGINE NOT RUNNING OR IGNITION OFF | |
| DETECTION OF OBSTRUCTION / COLLISION IN VEHICLE PATH | REMOVAL OF OBSTRUCTION |
| OPERATOR OF VEHICLE ASLEEP | OPERATOR OF VEHICLE AWAKE |
| OPERATOR OF VEHICLE INTOXICATED | NON-INTOXICATED OPERATOR |
| FAILURE OF CRITICAL AUTOMOTIVE SYSTEM | REPAIR OF CRITICAL AUTOMOTIVE SYSTEM |
| MINOR VEHICLE COLLISION | ELAPSE OF PREDETERMINED TIME |
| MAJOR VEHICLE COLLISION | VEHICLE REPAIR |
| VEHICLE FIRE DETECTED | VEHICLE REPAIR |
| ATTEMPTED / VEHICLE THEFT | SECURE OVERRIDE FAULT |
| | MANUAL OVERRIDE CLEARS ANY FAULT DETECTION AND DISENGAGE SECURE STOP MODE |

FIG. 7

FAULT REACTIVE SECURELY STOPPED VEHICLE METHOD AND APPARATUS

RELATED APPLICATIONS

This is a continuation-in-part of U.S. patent application Ser. No. 09/917,086 filed Jul. 27, 2001; which is a continuation-in-part of U.S. patent application Ser. No. 09/634,279 filed Aug. 9, 2000 now U.S. Pat. No. 6,286,617.

FIELD OF THE INVENTION

This invention relates in general to the field of vehicles and more particular to the field of vehicle braking systems.

BACKGROUND OF THE INVENTION

A vehicle, such as a street driven automobile, often stops at intersections in response to traffic lights. While waiting for a traffic light signal to turn green, indicating a time to accelerate the vehicle is supposed to remain stopped. A problem arises when, contrary to the intention of a vehicle operator, the vehicle does not remain stopped. One example is when an operator's foot accidentally slips off of the vehicle's brake pedal. Another example is when some kind of a fault occurs for example when a vehicle is impacted from the rear, the operator's foot may slip off the brake pedal or may not have enough brake pressure to prevent forward motion of the vehicle. Such situations can result in a collision with another vehicle. For example, the a rear collision could force a vehicle into a second collision with a vehicle ahead, or worse force the vehicle into an intersection resulting in a severe broadside collision. Since vehicle collisions are undesirable, it is desirable to provide a vehicle that remains securely stopped when the operator intends the vehicle to be stopped.

Vehicle operators often claim that accidents result from unintentional shifting of a vehicle into a drive gear, such as a shift from park or neutral to reverse, causing unexpected vehicle movements and collisions. Thus, it is desirable to provide a vehicle with improved safety which does not produce unexpected vehicle movements upon an unintentional drive gear shift.

When the traffic light generates a green light signal, it is desirable to provide a securely stopping vehicle which accelerates in a way the operator is accustom: fast starts for rapid acceleration and smooth starts for normal acceleration. Furthermore, when operating the vehicle in slow traffic or approaching a stop light it is desirable that a vehicle with secure stopping does not interfere with low speed acceleration and braking of the vehicle.

DETAILED DESCRIPTION OF THE INVENTION

Figure 1:
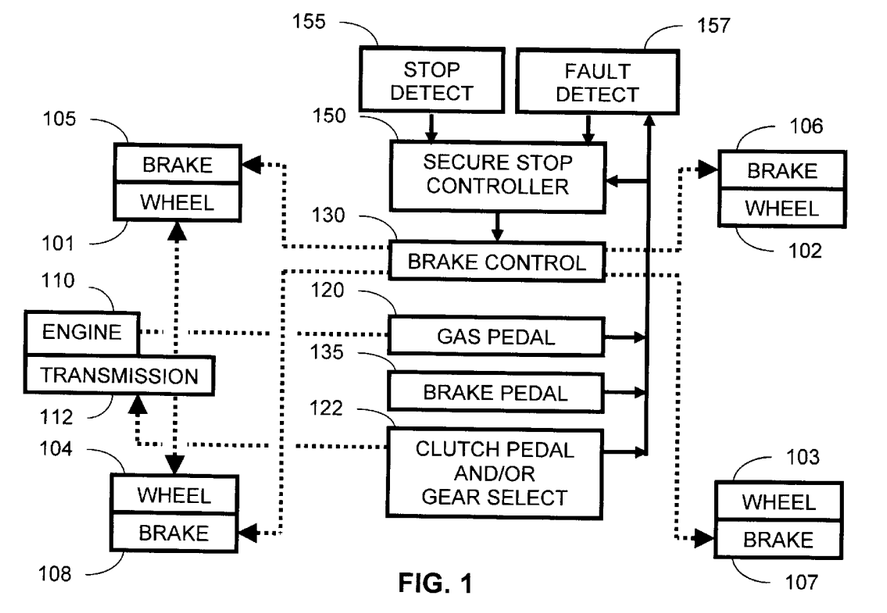
FIG. 1 shows a block diagram of a vehicle operating in accordance with the present invention.

FIG. 1 shows a block diagram of a vehicle operating in accordance with the present invention. The vehicle has four wheels, 101–104, each wheel having a corresponding brake, 105–108. The brakes 105–108 may be either disk or drum or other system for stopping the vehicle. In a front wheel drive embodiment, the front wheels 101–102 are driven by an engine 110 and a transmission 112. The engine is preferably an internal combustion engine as is commonly used in vehicles today. The transmission is either an automatic transmission or a manually shifted transmission having a manually operated clutch for coupling the engine to the wheels. The engine is manually throttled by a throttle or gas pedal 120. The engine throttle may be mechanically coupled to the gas pedal, or electronically controlled "by wire" in response to the gas pedal. The clutch of the transmission is controlled by a clutch pedal 122. The gear of the transmission is controlled by gear selector 122 which either selects between park, reverse, neutral and several forward gears if an automatic transmission or neutral, reverse and several forward gears if a manual transmission. A brake controller 130 is responsive to a brake pedal 135. The brake controller may include a master cylinder or an anti-lock brake system for controlling the brakes 105–108. The brake controller 130 and brakes 105–108 are part of a braking system which is preferably a hydraulic braking system but other technologies are contemplated including air and electronic braking systems. In operation, when a foot of the operator applies increasing pressure to the gas pedal, the speed of the vehicle increases. When the foot of the operator applies pressure to the brake pedal, the speed of the vehicle decreases. The amount of pressure applied to the brake pedal regulates the rate at which the speed of the vehicle decreases and thus the braking force used to reduce the speed of the vehicle. When the vehicle has stopped, typically very little brake pedal pressure is required to maintain the vehicle in a stopped condition. In a vehicle with an automatic transmission, the operator applied brake pedal pressure typically need only be enough to overcome the minimal acceleration of an idling engine which is applied to the wheels. In a vehicle with a manual transmission, the typical operator applied brake pedal pressure typically need only be enough to overcome gravitational accelerations due to the vehicle being situated on a hill.

With such little pressure required to typically maintain a vehicle in a stopped condition, an operator may unintentionally provide too little brake pedal pressure, enabling the vehicle to move, which may result in a collision. Examples of unintentionally providing too little brake pressure include: when the operator is excessively tired or sleepy; when the operator is tending to other matters while the vehicle is stopped, such as caring for children, fetching documents, or operating a radio receiver, cassette tape or compact disk; or when the operator is actively engaged in conversations on a wireless phone or with fellow passengers or while singing a song.

Furthermore, with such little pressure required to typically maintain a vehicle in a stopped condition an operator is unlikely to be providing the brake pressure needed to prevent the vehicle from colliding with a third vehicle in the event of being impacted by a second moving vehicle. This is particularly true if the operator's vehicle is impacted from either the rear or front by the second vehicle. Such collisions are typical when a vehicle is stopped at an intersection.

When acceleration from a stopped condition is desired, because a traffic light turns green for example the foot of the operator of a vehicle with an automatic transmission is removed from the brake pedal and applied to the gas pedal. The operator of a vehicle with a manual transmission typically has one foot on the clutch pedal and one foot on the brake pedal waiting for the traffic light to turn green. A triple movement is required when the light turns green: first, one foot is removed from the brake pedal and then second, the foot is applied to the gas pedal while third, the other foot releases the clutch pedal. This can be a complex operation, particularly when the vehicle is directed up a hill because the vehicle tends to unintentionally roll backwards between the time when the brake pedal is released, the gas pedal is pressed and the clutch pedal is released. Thus, a small time delay results from the time the light turns green to when the operator's foot is applied to the gas pedal.

The invention provides for the problems with a secure stop controller 150, a stop detector 155 and a fault detector 157. The secure stop controller 150 receives signals from the gas pedal 120, clutch pedal and/or gear selector 122, brake pedal 135, stop detector 155 and fault detector 157 and applies an additional signal to brake controller 130 to apply or release brakes 105–108. The stop detector 155 is coupled to a velocity detector such as a speedometer. Alternately, the stop detector 155 may be used in conjunction with a slip detector, an anti-lock brake system or other vehicle component that is able to determine if the vehicle is stopped. In the preferred embodiment the stop detector 155 generates a vehicle stopped signal upon or shortly after the vehicle has stopped.

The fault detector 157 determines if the vehicle is being subjected to a faulty condition. A faulty condition includes a vehicle collision which may be detected by devices including an acccelerometer measuring sudden acceleration or an acoustic transducer listening for a collision sound. Other methods of collision determination are also anticipated. Faulty conditions can also include other detectable vehicle malfunctions such as failures in engine and transmission controls which may result in undesirable acceleration of the vehicle. Other malfunctions include open doors, engine fires or failures of computer or other control systems. Faulty conditions can also include operator or operation problems rendering an operator unable or insufficiently competent to operate the vehicle. Such conditions include the operator falling asleep or being intoxicated or having an improper gaze, such as looking at the vehicle stereo or navigation system. Sleep, gaze and intoxication detectors are known in the art and may use eye monitoring technology to make a determination. Another example of an operator or operation problem is when an operator intends to back out of a garage but the garage door is closed or the vehicle is in a forward gear. In either situation a radar or sonar or other object detector, such as object detectors found in collision avoidance systems, could detect the closed garage door at the rear of the car of the garage wall at the front of the car. In response, the fault detector determines the operator has placed the vehicle in gear and that a collision is likely if the vehicle is accelerated. In response the vehicle remains securely stopped, an alert signal could be further provided to the operator. Other operator problems include the operator having an improper wireless telephone conversation or placing the vehicle in a neutral condition, decoupling the wheels from the engine. Still other operator problems include medical conditions rendering the operator incapacitated such as a coronary, seizure or regurgitation. Other fault conditions include combinations of malfunctions and operator error such as undesired or accidental shifting of a vehicle into a reverse gear.

Figure 2:
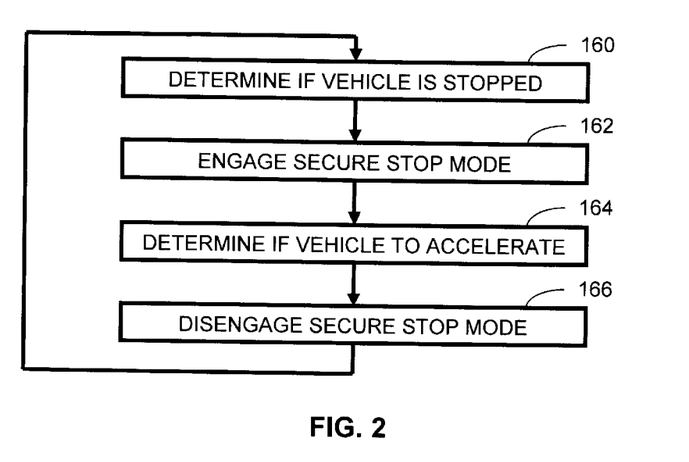
FIG. 2 shows a basic flow diagram for a method of securing a motor vehicle in a stopped condition in accordance with the present invention.

FIG. 2 shows a basic flow diagram for a method of securing a motor vehicle in a stopped condition in accordance with the present invention. Refer also to FIG. 1. When step 160 determines that the vehicle has stopped, stop detector 155 generates a vehicle stopped signal.

Most normal driving functions are performed during step 160, until the vehicle is stopped. In response, secure stopping is engaged at step at step 162 where the secure stop controller 150 sends a secure stop signal to the brake controller 130 to engage the brakes 105–108 with a force equivalent to significant brake pedal pressure by the operator. If the brake controller is an anti-lock brake system, the brake controller may modulate the brakes to provide improved stopping power in the event of a collision with the second moving vehicle. Since the vehicle is stopped, the operator is not necessarily aware of any significant braking force applied to brakes by the secure stop controller. In an alternate embodiment a dash board light or other signal may be generated to indicate activation of the secure stopped mode to the operator. In an alternate embodiment the brake pressure may be set by the operator and brake pressure maintained by the secure stop controller. Then step 164 determines if the operator intends for the vehicle to accelerate. In various embodiments this determination is made in response to the operator applying pressure to the gas pedal, releasing the clutch pedal or releasing the brake pedal, or a combination thereof. In response, step 166 disengages secure stopping. Secure stop controller 150 terminates the secure stop signal and the brake controller 130 disengages the brakes 105–108 allowing the speed of the vehicle to increase.

Figure 3:
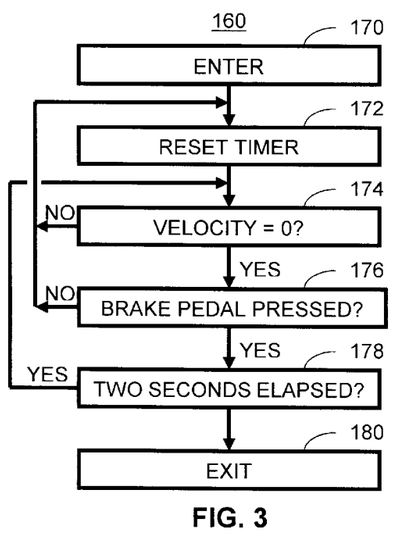
FIG. 3 shows a detailed flow diagram of the step of determining if a vehicle has been stopped.

FIG. 3 shows a detailed flow diagram of the step of determining if a vehicle has been stopped. This corresponds to step 160 of FIG. 2. After entry at step 170, a timer is reset at step 172. The timer continues to be reset if vehicle velocity is not zero at step 174 and the brake pedal is not pressed at step 176. If however, the velocity is zero and while the brake pedal remains pressed for preferably two seconds at step 178, then the vehicle stopped signal is generated and the flow exits at step 180 to proceed to step 162 of FIG. 2. Thus, the vehicle is stopped for a predetermined time of two seconds with the brake applied before the secure stop signal is generated at step 162. Other predetermined times may be used. Alternately, the vehicle stopped signal could be generated when the velocity is zero for a different predetermined time. Or the vehicle stopped signal could be generated after the vehicle has stopped and the suspension settles out from the typical front end dive and consequential rocking motion resulting from the vehicle stopping. This settling could be sensed by a vehicle with active suspension or suspension motion sensors or accelerometers. This embodiment automatically compensations for aging suspension components such as shock absorbers that may increase the suspension settling time with age. These methods are alternatives to generating the vehicle stopped signal simply in response to the speed equaling zero. These methods have an advantage in that the secure stopping system is typically not engaged in stop and go traffic where a vehicle crawls along at a low speed with abrupt applications of the brake which may temporarily bring the vehicle to a stop. In such cases it may be desirable to not engage the secure stopping. Nevertheless, engagement of secure stopping in simply in response to the vehicle coming to a stop is an embodiment of the invention.

Figure 4:
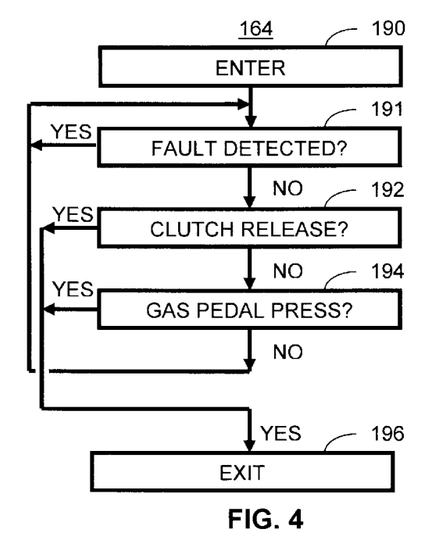
FIG. 4 shows a detailed flow diagram of the step of determining if a vehicle is to accelerate.

FIG. 4 shows a detailed flow diagram of the step of determining if a vehicle is to accelerate. This corresponds to step 164 of FIG. 2. After entry at step 190 step 191 determines if a fault has been detected. The fault could be any kind of fault including the aforementioned faults resulting from a collision from another vehicle, a malfunction of the vehicle and/or a fault resulting from the operator being insufficiently able to operate the vehicle. If a fault is detected, then step 191 causes the brakes to continue to be engaged in the secure stop mode even if other conditions for an acceleration signal are met. In the event of a collision, the secure stop mode can significantly reduce the amount of acceleration of the vehicle thereby not only potentially preventing a secondary collision, but also reducing the impact acceleration experienced by the vehicle operator and passengers, thereby reducing the potential for personal injury. If no fault condition, step 192 checks if the clutch is released. This step is always "NO" for an automatic transmission. Step 194 checks if the gas pedal is pressed. This is an optional step for a manual transmission. This process effectively causes the system to remain in the secure stop mode until the operator either releases the clutch or presses on the gas pedal. Upon detection of either event, the process exits through step 192 to step 166 of FIG. 2 to disengage the secure stop mode. In the preferred embodiment, once the secure stop mode is engaged, the vehicle will remain stopped if the brake pedal pressure is reduced or even if the operator's foot is removed from the brake. This prevents unintentional movement of the vehicle. Furthermore if the vehicle is on a hill, it will not roll backwards. This simplifies the problem of accelerating from a stopped condition with a manual transmission while on a hill because the vehicle does not start to move as soon as the operator's foot is removed from the brake. In an alternate embodiment where the secure stop mode is released only in response to release of the clutch. In this embodiment the operator may even begin to rev the engine before the secure stop mode releases brakes in response to the operator releasing the clutch, thereby assuring that the engine is producing sufficient power to begin climbing the hill as the clutch is released.

In another embodiment, steps 192 and 194 are replaced with a test for release of the brake pedal. In this embodiment, the vehicle is securely stopped so long as the vehicle is stopped and the operator's foot is on the brake. Upon releasing the brake the vehicle is no longer securely stopped. In this mode under normal conditions the operator may not even notice the vehicle's secure stopping attribute. However, step 191 works to keep the vehicle securely stopped due to a fault detection even if the operator's foot is removed from the brake. For example, if the securely stopped vehicle is involved in a collision, the secure stop mode remains engaged even if the operator releases the brake pedal as a result of the collision. Alternately, if the operator falls asleep while the vehicle is securely stopped, the vehicle will remain securely stopped even if the operator's foot falls off of the brake pedal as a result of the slumber. Any of a number of fault conditions can be used to keep the vehicle securely stopped. In an alternate embodiment, fault detector 157 and fault detection step 191 may be optionally eliminated.

Figure 5:
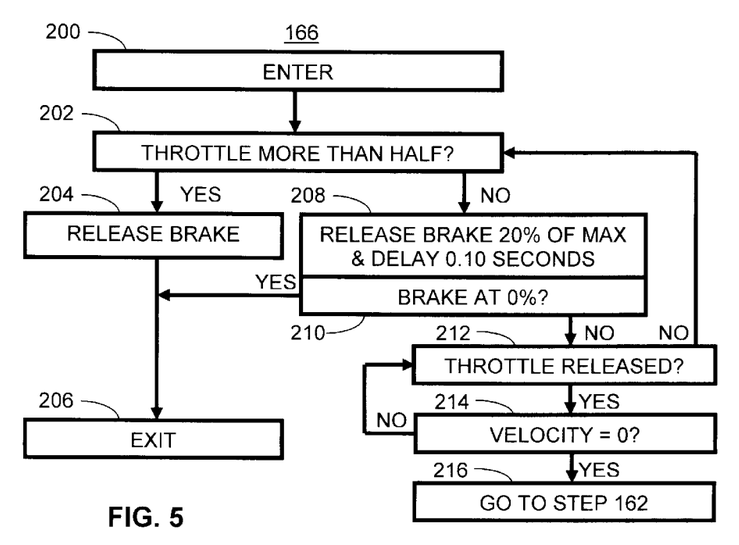
FIG. 5 shows a detailed flow diagram of the step of disengaging the secure stop mode.

FIG. 5 shows a detailed flow diagram of the step of disengaging the secure stop mode. This corresponds to step 166 of FIG. 2. The flow enters at step 200. Step 202 checks if the throttle or gas pedal 120 is more than halfway depressed. This step corresponds to determining the magnitude of a desired acceleration signal. If true then step 204 causes the secure stop signal to terminate in such a way as to cause the brake controller 130 to rapidly disengage the brakes 105–108. In this embodiment, the operator substantially depresses the throttle indicating a desire for rapid acceleration. In response, the brakes are rapidly released. However, if the throttle is less than half depressed, it is presumed that the operator desires a smoother transition from a stopped vehicle to a moving vehicle and the brakes are gradually released. Step 208 releases the brakes by 20% of the maximum secure stop setting every one hundred milliseconds until the brakes are released at step 210. This process occurs so long as the operator's foot remains on the gas pedal at step 212. Assuming the secure stop mode provides a maximum engagement of the brakes, steps 202, 208, 210 and 212 gradually release the brakes of a predetermined time as the gas pedal is depressed. In the preferred embodiment, the brakes transition from fully engaged to fully disengaged over a one-half second interval. If at any time during that one-half second interval throttle is depressed to more than one half at step 202, the brakes are entirely disengaged at step 204, allowing for more rapid acceleration. FIG. 5 shows one example of a release of the brakes corresponding to an amount of desired acceleration. Predetermined values other than those shown in FIG. 5 are anticipated. Other variations are also anticipated including a more direct relationship between throttle position and release rate of the brakes wherein the rate may be non-linear. Alternately, the brakes could be released according to a predetermined process that is independent of the throttle position, including a simple rapid release of the brakes.

For the vehicle operator desiring rapid acceleration from a traffic light, steps 200–206 adds no delay over a vehicle that does not have a secure stop mode. Indeed the secure stop mode enables even more rapid starts by reducing the time from the appearance of a green light to when the vehicle is accelerated. This is because the operator's foot may rest upon the gas pedal waiting for the green light while the secure stop mode applies the brakes for the operator. This eliminates the delay encountered by requiring the operator's foot to move from the brake pedal to the gas pedal in response to the green light.

For the vehicle operator desiring a smooth transition from a vehicle stopped mode to a vehicle moving mode, the gradual release of the brakes by steps 200, 202, 208 and 210 eliminate any sudden jerking acceleration experienced by a rapid release of the brakes. Furthermore, the process recovers from an accidental light punching of the gas pedal while waiting at a traffic light without necessarily having to reapply the brakes. If during the one half second gradual brake release process, the operator's foot is removed from the gas pedal as determined at step 212, then releasing of the brake of step 208 is discontinued until the velocity of the vehicle returns to zero at step 214. Alternately, brake pressure can be gradually increased to further facilitate stopping of the vehicle. Thereafter, the process returns to step 162 of FIG. 2 to enable the secure stop mode. Thus, a short tap on the gas pedal slightly releases the brakes allowing a slight movement of the vehicle. Since the brakes are still applied, albeit with less stopping force, the vehicle slows to a stop and again returns to the secure stop mode. This allows the operator to "inch" the vehicle forward by lightly tapping on the gas pedal. In an alternate embodiment, this function may be eliminated by eliminating steps 212–216 and having step 210 proceed directly to step 202.

In an alternate embodiment, the determination an operator's desire for acceleration of step 164 could be made in response to the operator simply releasing the brake pedal. While this mode may not prevent the vehicle from moving when the operator's foot is removed from the brake, it does ensure that the vehicle's brakes are securely engaged even with a light brake pressure while the vehicle is stopped.

Figure 6:
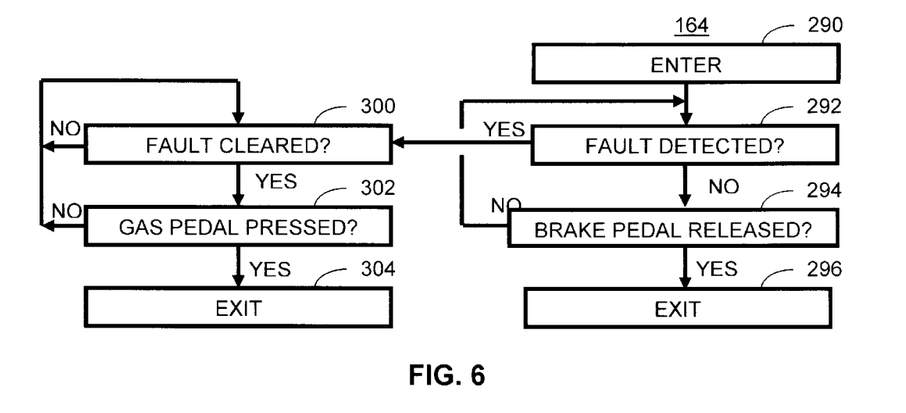
FIG. 6 shows an alternate embodiment of a detailed flow diagram for determining if the vehicle is to accelerate.

FIG. 6 shows an alternate embodiment of a detailed flow diagram for determining if the vehicle is to accelerate. In this embodiment a first operator input is used to determine if the vehicle is to accelerate if there is no fault and a second operator input is used to determine if the vehicle is to accelerate if a fault has been detected. In this embodiment, the secure stop mode reacts to the fault be changing the source of the acceleration signal, preferably from brake pedal release to gas pedal depression. The flow enters at step 290. If a fault is not detected at step 292 then the program exits at step 296 if the brake pedal is released at step 294. However, if a fault is detected at step 292 then step 300 determines if the fault is cleared. If cleared then the program exits at step 304 upon the gas pedal being pressed. Thus, if no fault is detected, the secure stop to mode operates virtually transparently to a vehicle without secure stop, except that the vehicle brakes are substantially applied when the vehicle is stopped. When the brake pedal is released, the secure stop mode is also released. However, if a fault is detected, the secure stop mode is maintained until the fault is cleared at step 300. The brake pressure of the secure stop mode is preferably greater than the pressure applied by the operator, but in an alternate embodiment, the brake pressure could be set by the operator and maintained to the setting in the secure stop mode. Upon clearing the fault, the secure stop mode is released in response to the gas pedal being pressed at step 302, rather than release of the brake pedal at step 294. Thus, the secure stop mode will be maintained if a fault is detected and the brake is unintentionally released. It should be noted that if the conditions of steps 302 and 294 were made identical, then the flow chart of FIG. 6 would be substantially identical to the flow chart of FIG. 4.

Figure 7:
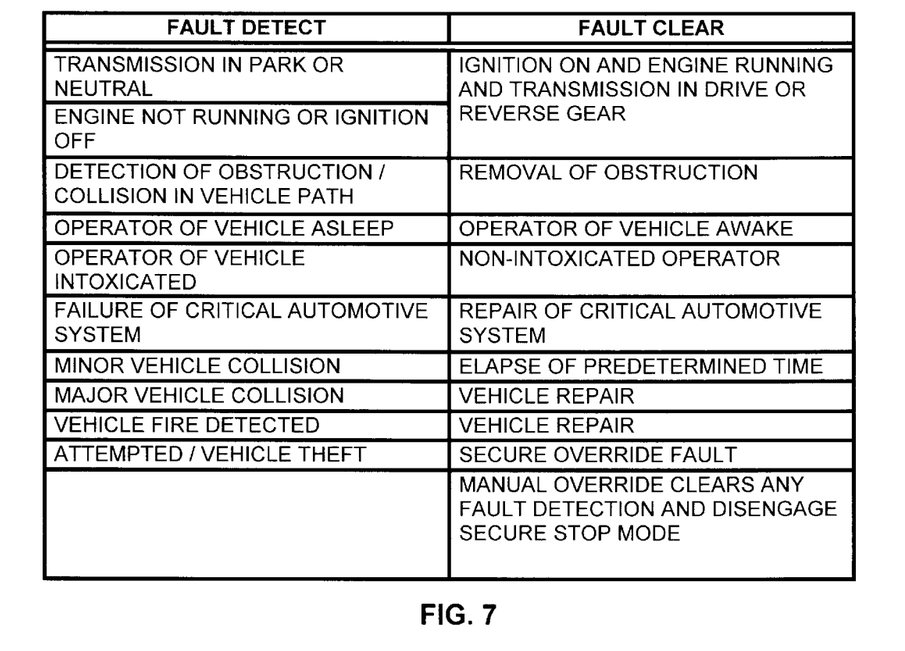
FIG. 7 shows a table of various conditions for fault detection and fault clearing.

FIG. 7 shows a table of various conditions for fault detection and fault clearing for FIG. 6 or FIG. 4. The table is illustrative, other fault detection and clearing conditions are anticipated.

For example in the process flow of FIG. 6, if the vehicle is shifted into neutral or park while stopped, the secure stop mode is maintained until the ignition is on, the engine running and the transmission shifted to a drive gear, clearing the fault, and further if the gas pedal is pressed. Thus, if an operator stops the vehicle and gear selects park, then the secure stop mode is engaged and maintained, even if the vehicle is turned off. Upon restarting the vehicle and placing the vehicle in gear, the secure stop mode is not released upon gear selection or release of the brake, but rather released upon the pressing of the gas pedal. Thus, if the a drive gear is unintentionally selected, the secure stop mode maintains the vehicle in a stopped condition until the operator presses the gas pedal. Thus, preferably the vehicle does not move until there is an intentional act on the part of the operator pressing the gas pedal. This embodiment should help make a safer vehicle and reduce claims of unintentional movements of the vehicle due to gear selection. Furthermore, maintaining the vehicle in secure stop mode in response to the engine being off should facilitate parking on a hill or deter vehicle towing or other parking brake applications.

FIG. 7 further shows different responses in the event of a collision. In the event of a fault detection in response to a minor collision the fault is not cleared until elapse of a predetermined time, such as fifteen seconds for example. Thereafter the vehicle may be again driven upon pressing of the gas pedal. Thus, if the operator's foot slips from the brake during the collision, the secure stop mode is maintained even if the gas pedal is unintentionally pressed shortly thereafter, preventing a potential secondary collision due to premature release of the brakes. However, in the event of a major collision, the secure stop mode is not released until the vehicle has been repaired, or manually over ridden. Airbag deployment is one method of distinguishing between a major and a minor collision. The collision is minor if an airbag is not deployed while the collision is major if an airbag is deployed.

FIG. 7 also shows a theft deterrent mode where the vehicle is securely stopped in the event of a theft. Determination of the theft can be made after the vehicle is stolen and while it is stopped or moving. In this case the fault is detected before the vehicle stops. Upon stopping, the secure stop mode is engaged and the vehicle brake is applied until a secure mode allows clearing of the fault. Thus, in a vehicle with an ability to receive wireless telemetry, the vehicle theft status could be determined by the owner and then wirelessly transmitted to the vehicle. When the vehicle is brought to a stop, it is held stopped by the secure stop mode. An alarm may also be sounded and the ignition may also be switched off.

The invention has the advantage in that most all of the hardware of FIG. 1 exists in a modem automobile. Enhanced processes performed by the brake controller, 130, secure stop controller 150, fault detector and stop detector 155 may be implemented in software executed in either an automobile's anti-lock braking system and/or electronic system controller.

Thus what has been provided is a vehicle that remains securely stopped when the operator intends the vehicle to be stopped. The vehicle will remain in the securely stopped mode if a fault is detected. What has also been provided is a vehicle able to accelerate from a stop in a manner intended by the operator, as well as an improved mode of rapid acceleration from a stop and an improved mode of inching forward while stopped. What has further been provided is a vehicle with improved safety which does not produce unexpected vehicle movements upon an unintentional drive gear shift.

We claim:

1. A securely stopped vehicle comprising:

a braking controller for engaging a vehicle brake for reducing vehicle speed in response to a braking input from an operator of the vehicle;

a secure stop controller coupled to said braking controller for generating a secure stop signal in response to the vehicle coming to a complete stop, wherein said braking controller maintains the vehicle brake engagement in response to the secure stop signal;

an acceleration detector for generating an acceleration signal in response to an acceleration input from the operator, wherein said secure stop controller is further coupled to said acceleration detector for terminating the secure stop signal in response to the acceleration signal, thereby disengaging the vehicle brake in response to the acceleration signal;

a fault detector for detecting a fault, wherein said secure stop controller is further coupled to said fault detector and the secure stop signal is maintained upon detection of the fault, thereby maintaining activation of the vehicle brake in response to the fault and;

first and second operator controls wherein said acceleration detector generates the acceleration signal in response to an operation of said first operator control if a fault is not detected prior to termination of the secure stop signal, and said acceleration detector generates the acceleration signal in response to an operation of said second operator control in response to the fault being detected prior to termination of the secure stop signal.

2. The vehicle according to claim 1 wherein
said first operator control corresponds to a brake pedal for controlling engagement of the vehicle brake and the acceleration signal is generated in response to no detection of a fault and a release of the brake pedal, and
said second operator control corresponds to a gas pedal for controlling acceleration of the vehicle and the acceleration signal is generated in response to detection of the fault and an actuation of the gas pedal.

3. The vehicle according to claim 2 wherein said acceleration detector generates the acceleration signal in response to operation of said second operator control in response to a fault being detected prior to termination of the secure stop signal and further in response to the fault being corrected prior to operation of the second operator control.

4. The vehicle according to claim 1 wherein the braking input from the operator is variable and
said braking controller applies a variable braking force for varying a rate of speed reduction in response to the variable braking input, and further wherein said braking controller maintains the vehicle brake at a force corresponding to a maximum variable braking input generated by the operator while the vehicle is at a complete stop.

5. The vehicle according to claim 1 wherein the braking input from the operator is variable and
said braking controller applies a variable braking force for varying a rate of speed reduction in response to the variable braking input, and further wherein said braking controller maintains the vehicle brake at a force greater than a force corresponding to the variable braking input generated by the operator while the operator is at a complete stop.

6. The vehicle according to claim 1 wherein said fault detector detects the fault in response to a vehicle collision, a vehicle malfunction or an inability of the operator to sufficiently operate the vehicle.

7. The vehicle according to claim 1 further comprising
a transmission for selecting between a neutral condition for disengaging an engine from a drive wheel of the vehicle and an engage condition for engaging the engine to the drive wheel, wherein
said fault detector detects the fault in response to the neutral condition.

8. The vehicle according to claim, 7 wherein said fault detector ceases detection of the fault in response to the drive condition.

9. The vehicle according to claim 7 further wherein
said second operator control includes a brake pedal for controlling engagement of the vehicle brake; and
said first operator control includes a gas pedal for controlling acceleration of the vehicle, wherein
the acceleration signal is generated in response to a release of the brake pedal if no neutral condition is detected prior to release of the brake pedal, or
the acceleration signal is generated in response to actuation of the gas pedal if the neutral conditions detected prior to release of the brake pedal.

10. The vehicle according to claim 7 wherein the neutral condition further includes a parking lock for locking the drive wheel while the vehicle is parked.

11. The vehicle according to claim 1 further comprising
a transmission for selecting between a forward engagement and a reverse engagement for moving the vehicle in either forward or reverse directions, wherein
said fault detector detects the fault in response to a change between forward and reverse engagements.

12. A method of securing a vehicle in a stopped condition comprising the steps of.
automatically engaging a braking system operated by an operator of the vehicle in response to the vehicle being stopped; and
detecting a fault, wherein said step of automatically engaging the braking system further maintains engagement of the braking system upon detection of the fault and further wherein the vehicle has a brake control enabling the operator to apply a varying pressure to the braking system, thereby allowing the operator to control an amount of braking of the vehicle and
said step of automatically engaging the braking system automatically increases the pressure applied to the braking system beyond a pressure applied by the operator in response to the vehicle coming to a complete stop.

13. The method according to claim 12 further comprising the step of
disengaging the braking system in response to an absence of detection of a fault and an acceleration signal from the operator thereby enabling acceleration of the vehicle.

14. The vehicle according to claim 12 wherein said step of detecting the fault detects the fault in response to detection of the vehicle being involved in a collision, thereby maintaining engagement of the braking system in response to the collision.

15. The vehicle according to claim 12 further having a transmission for selecting between a neutral condition for disengaging an engine from a drive wheel of the vehicle and an engage condition for engaging the engine to the drive wheel, wherein
said step of detecting the fault detects the fault in response to the neutral condition.

16. The vehicle according to claim 15 wherein the neutral condition further includes a parking lock for locking the drive wheel while the vehicle is parked.

17. The vehicle according to claim 12 further having a transmission for selecting between a forward engagement and a reverse engagement for moving the vehicle in either forward or reverse directions, wherein
said step of detecting the fault detects the fault in response to a change between forward and reverse engagements.

18. A securely stopped vehicle comprising:
a braking controller for engaging a vehicle brace for reducing vehicle speed in response to a braking input from an operator of the vehicle;
a secure stop controller coupled to said bracing controller for generating a secure stop signal in response to the vehicle coming to a complete stop, wherein said braking controller maintains the vehicle brake engagement in response to the secure stop signal;
an acceleration detector for generating an acceleration signal in response to an acceleration input from the operator, wherein said secure stop controller is further coupled to said acceleration detector for terminating the secure stop signal in response to the acceleration signal, thereby disengaging the vehicle brake in response to the acceleration signal;

a fault detector for detecting a fault, wherein said secure stop controller is further coupled to said fault detector and the secure stop signal is maintained upon detection of the fault, thereby maintaining activation of the vehicle brake in response to the fault;

a transmission for selecting between a neutral condition for disengaging an engine from a drive wheel of the vehicle and an engage condition for engaging the engine to the drive wheel, wherein said fault detector detects the fault in response to the neutral condition;

a brake pedal for controlling engagement of the vehicle brake; and a gas pedal for controlling acceleration of the vehicle, wherein the acceleration signal is generated in response to a release of the brake pedal if no neutral condition is detected prior to release of the brake pedal, or the acceleration signal is generated in response to actuation of the gas pedal if the neutral condition is detected prior to release of the brake pedal.

19. The vehicle according to claim 18 wherein said fault detector ceases detection of the fault in response to the drive condition.

20. The vehicle according to claim 25 wherein said braking controller enables the operator to apply a varying braking force to the vehicle, thereby allowing the operator to control an amount of braking of the vehicle and said braking controller increases the braking force beyond a braking force applied by the operator in response to the vehicle coming to a complete stop.

* * * * *